United States Patent [19]

Oudshoorn et al.

[11] Patent Number: 4,739,312

[45] Date of Patent: Apr. 19, 1988

[54] RGBI TO MULTILEVEL GREY SCALE ENCODER

[75] Inventors: Mark Oudshoorn, Wheeling; Al Stankus, Melrose Park, both of Ill.

[73] Assignee: Rich, Inc., Franklin Park, Ill.

[21] Appl. No.: 874,040

[22] Filed: Jun. 13, 1986

[51] Int. Cl.[4] .......... G06F 3/14; H04N 11/04; H04N 11/12

[52] U.S. Cl. .......... 340/703; 358/13

[58] Field of Search .......... 340/703, 793; 358/81, 358/82, 13

[56] References Cited

U.S. PATENT DOCUMENTS 3,603,962 9/1971 Lechner .......... 340/703

FOREIGN PATENT DOCUMENTS 33422 3/1977 Japan .......... 358/13
66332 6/1977 Japan .......... 340/703
138342 10/1979 Japan .......... 340/703

*Primary Examiner*—John W. Shepperd
*Attorney, Agent, or Firm*—Stiefel, Gross & Kurland

[57] ABSTRACT

An encoder (500) encodes a TTL type of R,G,B,I video drive signal into a common multilevel grey scale digitally encoded composite video signal which is transmitted over a single coaxial cable (302). The incoming R,G,B,I bits, such as provided from a color computer (304, 306, 308, 310), are buffered and translated (**50*a*, 50*b*) from TTL to ECL and fed to a common video digital-to-analog converter (100) along with translated composite sync information (312, 314, 10, 324). A white reference level signal is dynamically derived from the translated sync information (200, 202) and provided to the full height input of the video D/A converter (324, 100**) which converts the translated R,G,B,I input into a 16 level multibit grey scale code in a linear function from full intensity white to black, with a seventeenth level being provided in the digitally encoded composite video signal to represent sync information.

37 Claims, 3 Drawing Sheets

FIG.3
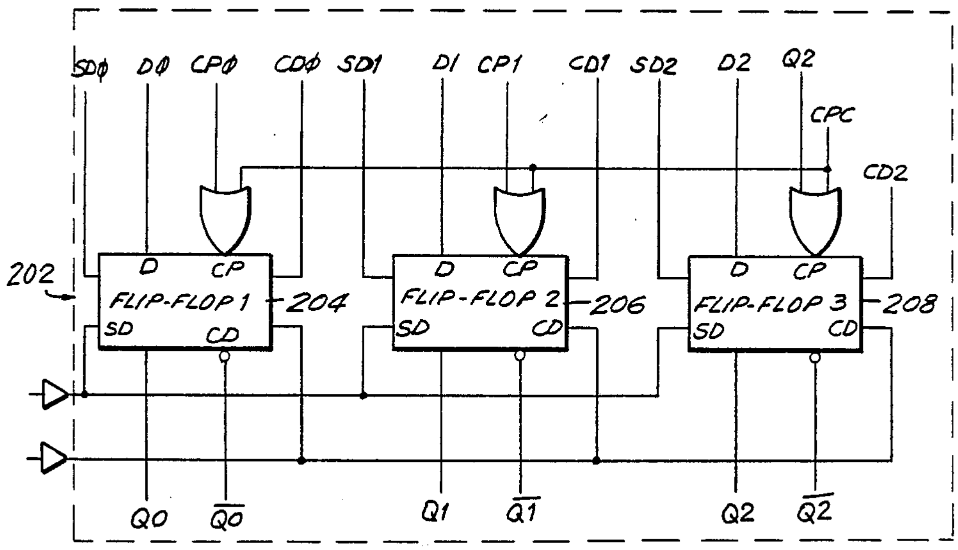
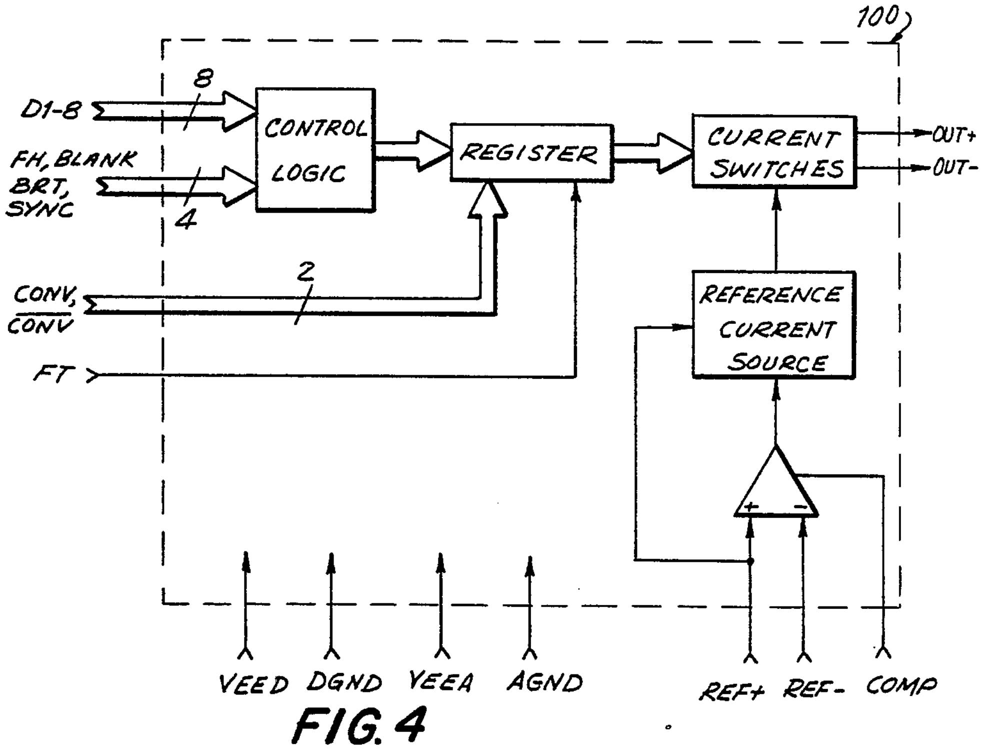
FIG. 4

RGBI TO MULTILEVEL GREY SCALE ENCODER

CROSS-REFERENCE TO RELATED APPLICATIONS

This application is related to the commonly owned, contemporaneously filed patent application entitled "Color Decoder Apparatus" naming Mark Oudshoorn, Al Stankus and Clyde Smith as joint inventors thereof, the contents of which are specifically incorporated by reference herein in their entirety.

TECHNICAL FIELD

The present invention relates to color encoder apparatus and methods for transmitting R,G,B,I video drive signals over a single coaxial cable and particularly to such encoders and methods for digitally encoding the R,G,B,I video drive signal into a common multilevel grey scale digitally encoded composite video signal based on a white reference level signal, such as one dynamically generated from sync information associated with the R,G,B,I video drive signals.

BACKGROUND ART

Systems which convert between color video signals and grey scale video signals are known in the art, as are systems employing digitally encoded video information, such as disclosed, by way of example, in U.S. Pat. Nos. 4,233,601; 4,345,276; 4,437,093; 4,373,156; 4,232,311; 4,368,484; 4,481,509; 4,481,594; 4,425,581; and 4,270,125. However, none of these prior art systems known to applicants is readily capable of use in systems where it is desired to inexpensively transmit computer generated color video information great distances over single coaxial cables to RGB type of monitors, such as normally employed with computer displays, such as an IBM PC. Moreover, no such systems are known to applicants which transmit both color and black and white video information in the same multilevel grey scale code format for ultimate display on the same RGB monitor. Furthermore, in this regard, applicants are not aware of any prior art encoders or systems which employ a 16 level grey scale code, i.e. 16 levels or shades of grey, to encode the video signal into 16 possible R,G,B,I color combinations to provide the four R,G,B,I color bits over a single coaxial cable with no loss of bandwidth in an efficient and cost effective manner. In addition applicants are not aware of any prior art encoders or systems which employ a single converter to convert all four R,G,B,I bits into a common multilevel grey code for transmission over a single coaxial cable instead of requiring separate converters for each R,G,B, and I color intensity. These disadvantages of the prior art are overcome by the present invention.

DISCLOSURE OF THE INVENTION

The present invention relates to encoder apparatus and transmission methods for providing an R,G,B,I video drive signal over a single coaxial cable in which a TTL type of R,G,B,I video drive signal is digitally encoded into a common multilevel grey scale digitally encoded composite video signal, such as one having a sixteen level code for providing sixteen possible color combinations of R,G,B, and I, and a seventeenth level for providing sync information. The TTL type of R,G,B,I video drive signal is initially translated into separate ECL type of R,G,B,I video display information, which may be color or black and white video information, and sync information. A white reference level signal is dynamically generated from the translated sync information, which translated sync information comprises horizontal and vertical sync information, such as by a triple D type of flip-flop which is responsive to the translated sync information for providing the white reference level signal in response thereto, such as by employing the vertical sync to initially trigger the flip-flop with the next horizontal sync thereafter comprising the white reference level signal. A video digital-to-analog converter provides the multilevel grey scale digitally encoded composite video signal from the translated R,G,B,I video display information based on the generated white reference level signal, with the digitally encoded multilevel grey scale composite video signal comprising a plural bit code logically representing the R,G,B,I video drive signal display information as predetermined percentage of the white reference level signal. The translated sync information is converted into composite sync information, such as by ORing the horizontal and vertical sync, with the composite sync information then being fed to the converter and employed to provide the digitally encoded composite video signal, with this sync information comprising the aforementioned seventeenth level of the transmitted multilevel grey code digitally encoded composite video signal transmitted over the single coaxial cable. In this manner a multibit grey scale digitally encoded composite video signal may be provided from a TTL format R,G,B,I type of video drive signal for transmission over a single coaxial cable for great distances without loss of bandwidth.

BRIEF DESCRIPTION OF THE DRAWINGS

FIG. 3 is a logic diagram of a typical conventional triple D flip-flop employed in the schematic of FIG. 2 to generate the white reference level signal employed in the present invention; and FIG. 4 is a functional block diagram of a typical conventional video digital-to-analog converter employed in the schematic of FIG. 2 to provide the digitally encoded multilevel grey scale composite video signal employed in the present invention.

BEST MODE FOR CARRYING OUT THE INVENTION

Figure 1:
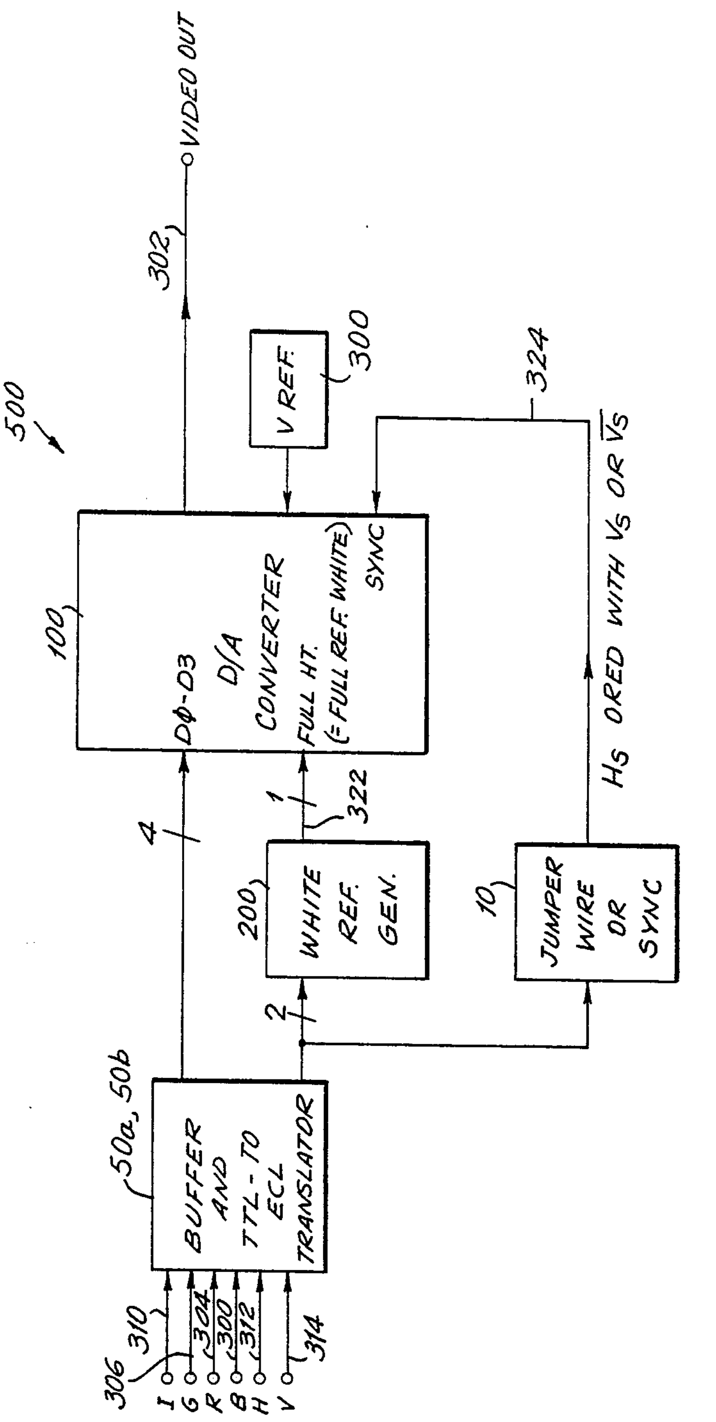
FIG. 1 is a functional block diagram of the presently preferred embodiment of a color encoder apparatus in accordance with the present invention and used in carrying out the presently preferred method of the present invention.

Referring now to the drawings in detail and initially to FIG. 1, the presently preferred embodiment of an encoder, generally referred to by the reference numeral 500, in accordance with the preferred method and apparatus of the present invention is shown. As will be explained in greater detail hereinafter, encoder 500 preferably enables conventional R,G,B,I video drive signals, such as comprising both video display information and sync information, in the form of the R,G,B,I color intensities normally employed by a conventional RGB monitor (not shown) and provided from a conventional RGB source, such as an IBM PC (not shown), and horizontal and vertical sync, to be converted into a common multilevel grey scale digitally encoded composite video signal for transmission over a single coaxial cable 302, such as a conventional 75 ohm transmission line over great distances to be decoded at the receiving end for display on a conventional RGB monitor (not shown). The decoding of this digitally encoded signal may preferably be accomplished by the decoder described in the aforementioned commonly owned copending U.S. patent application entitled "Color Decoder Apparatus" contemporaneously filed herewith, the contents of which are specifically incorporated by reference herein in their entirety. Suffice it to say at this point that the digitally encoded composite video signals may contain either color or black and white information which must be decoded and converted into a TTL type of format so as to be displayed on a conventional RGB monitor at the receiving end, irrespective of whether the original input video information contained in the transmitted signal was color or black and white. In those instances when only a single coaxial cable is desired or available, such as at installations employed at brokerage houses or stock exchanges using RGB monitors, the savings realized by the present invention can become significant, such as through the elimination of cross point switching at a video switch.

As will be explained in greater detail hereinafter, preferably the resultant digitally encoded composite video signal is a seventeen level grey scale coded signal with the video information preferably in a code comprising sixteen levels or shades of grey, termed the grey scale code herein, which is used to transmit the four R,G,B,I color bits, and with the seventeenth level or additional bit representing sync information. Moreover, as will also be further explained herein, all four R,G,B,I color bits are preferably converted into this common multilevel grey scale digitally encoded composite video signal for transmission over the single coaxial cable 302 by means of a common video digital-to-analog converter 100 as opposed to requiring separate converters for each of the four separate R,G,B, and I color intensities As shown and preferred in FIG. 1, the separate R,G,B, and I color bit inputs, 304, 306, 308 and 310, respectively, which are in a conventional TTL format, along with the H or horizontal sync and V or vertical sync inputs, 312 and 314, respectively, are initially provided to a conventional buffer 50*a* and conventional TTL-to-ECL translator 50*b*, to be described in greater detail with reference to FIG. 2. These RGB TTL input signals provided via parallel paths 304–314, inclusive, are provided from the RGB TTL output of a conventional color computer, for example, such as an IBM PC (not shown). As shown and preferred in FIG. 2, the buffer 50*a* may be a conventional LS 367 buffer with the TTL-to-ECL translator 50*b* being a conventional F100124 translator employing a conventional resistor pack or network 320 for termination of the TTL signals. It should be noted that the R,G,B,I code for the input signal is a conventional code weighted according to the perceived luminance value of colors which preferably is the same manner in which the code is preferably weighted in the video digital-to-analog converter 100 employed in the encoder 500 of the present invention. The buffered and translated output of translator 50*b*, which has been translated from TTL to ECL format, is preferably directly fed to the video digital-to-analog converter 100, such as a modified TDC 1018 available from TRW Inc., which is normally an 8 bit, 125 MSPS video digital-to-analog converter, and which has preferably been modified herein to accept an RGB 4 color bit input or intensity code and provide the preferred aforementioned seventeen level grey scale digitally encoded composite video signal as will be described in greater detail hereinafter, with the translated sync information also being fed to a white reference level signal generator 200 which dynamically generates a white reference level signal, via path 322, for use by the video digital-to-analog converter 100 in providing the preferred multilevel grey scale digitally encoded composite video signal. In this regard, the translated horizontal and vertical sync provided from translator 50*b* are preferably ORed in jumper network 10 and provided to the video digital-to-analog converter 100 sync input via path 324 as composite sync. It should be noted that the translated horizontal sync or Hs may be ORed with the translated vertical sync or Vs or its corresponding inverted signal Vs. As explained in greater detail, in the aforementioned copending patent application entitled "Color Decoder Apparatus", the white reference level signal provided via path 322 to the converter 100 is ultimately used by the decoder to enable the received digitally encoded multilevel grey scale composite video signal transmitted over cable 302 to be decoded back into a TTL type of R,G,B, video drive signal. In this regard, the white reference level signal provided via path 322 to video digital-to-analog converter 100 is preferably employed as the full height reference signal for the video digital-to-analog converter 100 and is derived from the translated horizontal and vertical sync signal outputs of translator 50*b* by use of a conventional triple D flip-flop 202, such as a Fairchild F100131, as will be described in greater detail hereinafter with reference to FIG. 3, which is a logic diagram of this flip-flop 202, such as employed in the product description of the Fairchild F100131 triple D flip-flop.

Figure 2:
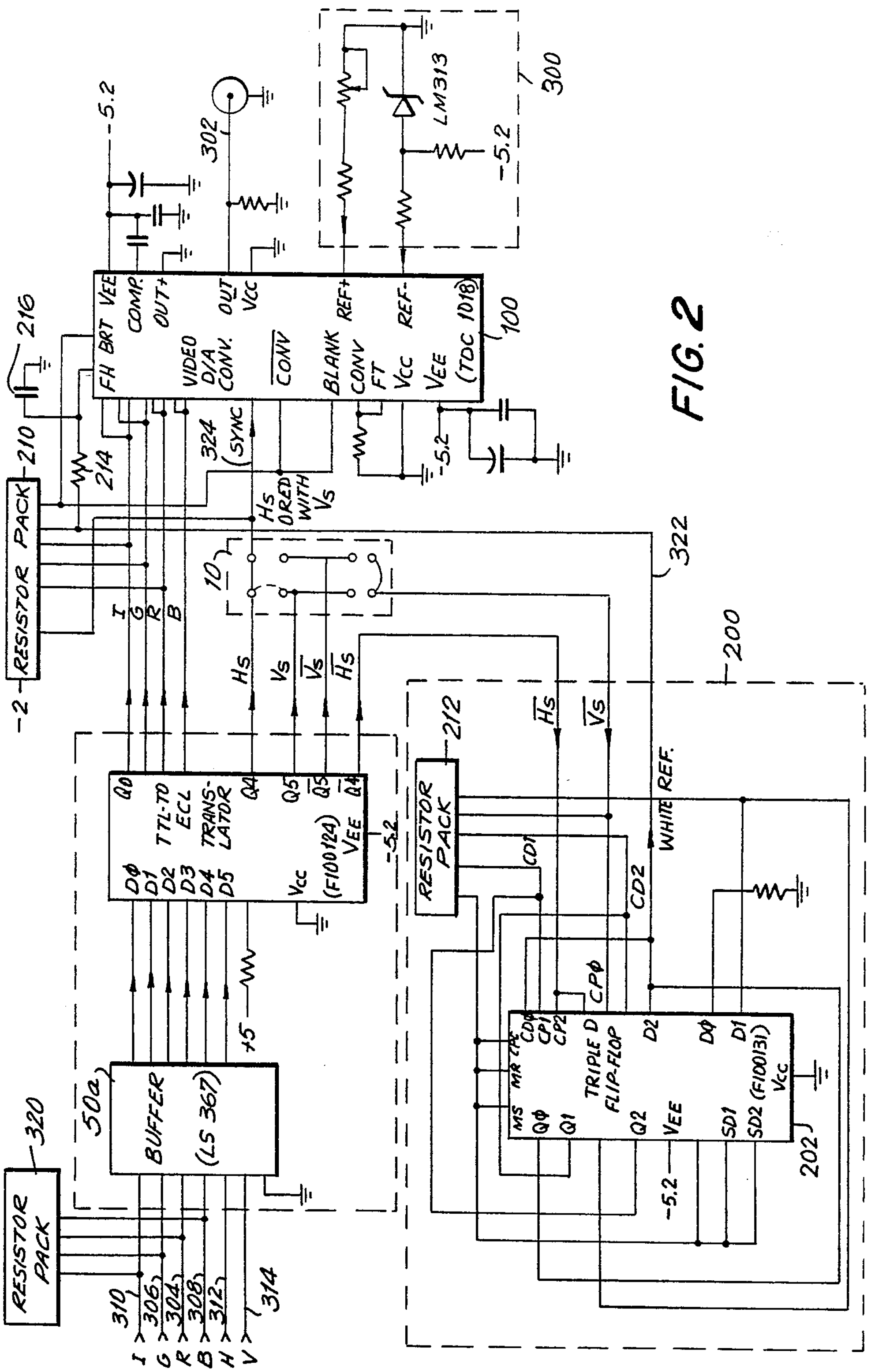
FIG. 2 is a schematic diagram corresponding to the functional block diagram of FIG. 1.

Referring now to FIGS. 2 and 3, the white reference level signal is preferably generated by the triple D flip-flop 202 in the following manner. When the translated inverted vertical sync signal Vs is provided to triple D flip-flop 202, its leading edge clocks a high to Q0 of flip-flop stage 204 which puts a high to the D1 data input of flip-flop stage 206. Flip-flop stage 206 is preferably clocked by the translated inverted horizontal sync signal Hs so that the next horizontal sync or Hs after Vs preferably clocks a high to Q1 of flip-flop stage 206, which signal is preferably the white reference signal, which puts a high on the D2 data input of flip-flop stage 208 which provides the white reference level signal via path 322 to the full height input of the video digital-to-analog converter 100. As shown and preferred in FIG. 2, resistor packs 210 and 212, respectively, are preferably associated with the conventional video digital-to-analog converter 100 and triple D flip-flop 202. In addition, as further shown and preferred in FIG. 2, the white reference level signal provided via path 322 to converter 100 is preferably provided through an R-C network 214-216 which provides an RC time constant to delay the white reference level signal for a sufficient time to provide a back porch to facilitate clamping, such as preferably 1.5 μsec, by way of example. When D2 of flip-flop stage 208 goes high, it clears flip-flop stage 204. The third horizontal sync or Hs, which is the second Hs following Vs, clocks a high on Q2 of flip-flop stage 208 which clears flip-flop stage 206. Lastly, flip-flop stage 208 is cleared by Q1 which goes high at the end of the white reference level signal which occurs directly after flip-flop stage 206 is cleared.

Referring once again to the presently preferred video digital-to-analog converter 100, converter 100 is shown in greater detail in FIGS. 2 and 4, with FIG. 4 representing a functional block diagram of the type used by TRW in its product description of the TDC1018 D/A converter, which is preferably employed, by way of example, as converter 100 when modified in the manner described herein. As shown and preferred in FIG. 2, the TDC 1018 employed as the video digital-to-analog converter 100 in the encoder 500 of the present invention, has been modified in order to preferably only employ 4 bits instead of the 8 bits normally provided by the TDC 1018 and to preferably only employ 16 levels of grey, instead of the 256 levels normally employed in the TDC 1018, in a linear function with the D5 and D1 inputs comprising the I bit input, the D2 and D6 inputs comprising the G bit input, the D3 and D7 inputs comprising the R bit input, and the D4 and D8 inputs comprising the B bit input of the TDC 1018, and being respectively tied together, so that all 4 bits ON represents the full height for converter 100 determined by the white reference level signal provided via path 322 to converter 100. Because the bits are tied together, a linear relationship from 0 bits ON to all bits ON occurs to provide the presently preferred 16 levels of grey to represent the 16 possible R,G,B, and I color combinations in sixteen equal steps from all 0's to all 1's. Thus, high intensity white, for example, is achieved when all four bits R,G,B, and I are ON, with the I bit preferably representing the most significant bit, the G bit representing the next most significant bit, the R bit representing the bit after that, and the B bit representing the least significant bit. Consequently, the digitally encoded multilevel grey scale composite video signal logically represents the R,G,B, and I video drive signal color intensity or video display information in a multibit code based on a predetermined percentage of the full height white reference level signal as conventionally determined by the modified TDC 1018, which preferably, conventionally also provides the composite sync information, as the aforementioned seventeenth level.

As described in the aforementioned commonly owned copending patent application entitled "Color Decoder Apparatus" incorporated by reference herein, when this digitally encoded composite video signal, which is transmitted over cable 302, is received by the decoder, the transmitted grey scale code provided by converter 100 is preferably mapped by a discrete flash converter with the bits being reconstructed based on the white reference. It should be noted, that preferably a conventional reference voltage, which is preferably adjustable, is also conventionally provided to the modified TDC 1018 employed as converter 100 by network 300.

Consequently, by utilizing the encoder apparatus of the present invention, a TTL format R,G,B,I video drive signal may readily be transmitted over a single coaxial without loss of bandwidth as a common digitally encoded multilevel grey scale composite video signal.

What is claimed is:

1. An encoder apparatus for encoding a TTL type of R,G,B,I video drive signal into a digitally encoded composite video signal for transmission over a single coaxial cable, said video drive signal comprising R,G,B,I video display information and sync information, said encoder comprising means for receiving said video drive signal and translating said video drive signal into separate ECL type of R,G,B,I video display information and sync information;

means operatively connected to said receiving means for generating a white reference level signal from said translated sync information; and means operatively connected to said receiving means and said white reference level signal generating means for providing a common multilevel grey scale digitally encoded composite video signal for transmission over said single coaxial cable from at least said translated R,G,B,I video display information based on said generated white reference level signal, said digitally encoded multilevel grey scale composite video signal comprising a plural bit code logically representing said R,G,B,I video drive signal video display information as a corresponding predetermined percentage of said white reference level signal; whereby a cable transmissable multibit grey scale digitally encoded composite video signal may be provided from a TTL format R,G,B,I type of video drive signal.

2. An apparatus in accordance with claim 1 wherein said common multilevel grey scale digitally encoded composite video signal providing means comprises means for converting said translated R,G,B,I video display information into said common multilevel grey scale digitally encoded composite video signal, and said converter means comprises a common video digital-to-analog converter means.

3. An apparatus in accordance with claim 2 wherein said translated sync information comprises horizontal sync information, said white reference level signal generating means providing said white reference level signal based on said horizontal sync information.

4. An apparatus in accordance with claim 3 wherein said translated sync information further comprises vertical sync information, said white reference level signal generating means providing said white reference level signal based on said translated sync information.

5. An apparatus in accordance with claim 1 wherein said translated sync information comprises horizontal sync information, said white reference level signal generating means providing said white reference level signal based on said horizontal sync information.

6. An apparatus in accordance with claim 5 wherein said translated sync information further comprises vertical sync information, said white reference level signal generating means providing said white reference level signal based on said translated sync information.

7. An apparatus in accordance with claim 1 wherein said translated sync information further comprises vertical sync information, said white reference level signal generating means providing said white reference level signal based on said translated sync information.

8. An apparatus in accordance with claim 1 further comprising means operatively connected between said translating means and said composite video signal providing means for providing composite sync information to said composite video signal providing means from said translated sync information, said composite video signal providing means providing said digitally encoded composite video signal from said translated R,G,B,I video display information and said composite sync information.

9. An apparatus in accordance with claim 8 wherein said common multilevel grey scale digitally encoded composite video signal providing means comprises means for converting said translated R,G,B,I video display information into said common multilevel grey scale digitally encoded composite video signal, said converter means comprising a common video digital-to-analog converter means.

10. An apparatus in accordance with claim 9 wherein said translated sync information comprises horizontal sync information, said white reference level signal generating means providing said white reference level signal based on said horizontal sync information.

11. An apparatus in accordance with claim 10 wherein said translated sync information further comprises vertical sync information, said white reference level signal generating means providing said white reference level signal based on said translated sync information.

12. An apparatus in accordance with claim 8 wherein said translated sync information comprises horizontal sync information, said white reference level signal generating means providing said white reference level signal based on said horizontal sync information.

13. An apparatus in accordance with claim 12 wherein said translated sync information further comprises vertical sync information, said white reference level signal generating means providing said white reference level signal based on said translated sync information.

14. An apparatus in accordance with claim 1 wherein said white reference signal generating means comprises triple D flip-flop means responsive to said translated sync information for providing said white reference level signal in response thereto.

15. An apparatus in accordance with claim 14 wherein said translated sync information comprises horizontal sync information, said white reference level signal generating means providing said white reference level signal based on said horizontal sync information.

16. An apparatus in accordance with claim 15 wherein said translated sync information further comprises vertical sync information, said white reference level signal generating means providing said white reference level signal based on said translated sync information.

17. An apparatus in accordance with claim 16 wherein said vertical sync information initially triggers said triple D flip-flop means, the next horizontal sync after said vertical sync trigger comprising said white reference level signal.

18. An apparatus in accordance with claim 17 wherein said common multilevel grey scale digitally encoded composite video signal providing means comprises means for converting said tanslated R,G,B,I, video display information into said common multilevel grey scale digitally encoded composite video signal, said converter means comprising a common video digital-to-analog converter means.

19. An apparatus in accordance with claim 18 further comprising means operatively connected between said translating means and said composite video signal providing means for providing composite sync information to said composite video signal providing means from said translated sync information, said composite video signal providing means providing said digitally encoded composite video signal from said translated R,G,B,I video display information and said composite sync information.

20. An apparatus in accordance with claim 1 wherein said multilevel grey scale digitally encoded composite video signal comprises a sixteen level code for providing sixteen possible color combinations of R,G,B and I.

21. An apparatus in accordance with claim 20 wherein said multilevel digitally encoded composite video signal further comprises a seventeenth level code for providing said composite sync information.

22. An apparatus in accordance with claim 20 wherein said common multilevel grey scale digitally encoded composite video signal providing means comprises means for converting said translated R,G,B,I video display information into said common multilevel grey scale digitally encoded composite video signal.

23. An apparatus in accordance with claim 22 wherein said converter means comprises a common video digital-to-analog converter means.

24. An apparatus in accordance with claim 21 wherein said common multilevel grey scale digitally encoded composite video signal providing means comprises means for converting said translated R,G,B,I video display information into said common multilevel grey scale digitally encoded composite video signal, said converter means comprising a common video digital-to-analog converter means.

25. An apparatus in accordance with claim 21 wherein said translated sync information comprises horizontal sync information, said white reference level signal generating means providing said white reference level signal based on said horizontal sync information.

26. An apparatus in accordance with claim 25 wherein said translated sync information further comprises vertical sync information, said white reference level signal generating means providing said white reference level signal based on said translated sync information.

27. An apparatus in accordance with claim 21 further comprising means operatively connected between said translating means and said composite video signal providing means for providing composite sync information to said composite video signal providing means from said translated sync information, said composite video signal providing means providing said digitally encoded composite video signal from said translated R,G,B,I video display information and said composite sync information.

28. An apparatus in accordance with claim 21 wherein said white reference signal generating means comprises triple D flip-flop means responsive to said translated sync information for providing said white reference level signal in response thereto.

29. An apparatus in accordance with claim 28 wherein said translated sync information comprises horizontal sync information, said white reference level signal generating means providing said white reference level signal based on said horizontal sync information.

30. An apparatus in accordance with claim 29 wherein said translated sync information further comprises vertical sync information said white reference level signal generating means providing said white reference level signal based on said translated sync information.

31. An apparatus in accordance with claim 30 wherein said vertical sync information initially triggers said triple D flip-flop means, the next horizontal sync after said vertical sync trigger comprising said white reference level signal.

32. An apparatus in accordance with claim 31 wherein said common multilevel grey scale digitally encoded composite video signal providing means comprises means for converting said translated R,G,B,I video display information into said common multilevel grey scale digitally encoded composite video signal, said converter means comprising a common video digital-to-analog converter means.

33. A method for transmitting an R,G,B,I video drive signal over a single coaxial cable comprising the steps of digitally encoding said R,G,B,I video drive signal into a common multilevel grey scale digitally encoded composite video signal, and transmitting said digitally encoded composite video signal over said single coaxial cable, said digitally encoding step comprising the step of digitally encoding said R,G,B,I video drive signal into said digitally encoded composite video signal based on a white reference level signal, said digitally encoded multilevel grey scale composite video signal comprising a plural bit code logically representing said R,G,B,I video drive signal video display information as a corresponding predetermined percentage of said white reference level signal, said white reference signal providing a common reference for a plurality of decoders for decoding said digitally encoded multilevel grey scale composite video signal; whereby said composite video signal is capable of providing a consistent video display on a plurality of video display devices.

34. A method in accordance with claim 33 wherein said digitally encoding step comprises the step of digitally encoding said R,G,B,I video drive signal into a digitally encoded composite video signal comprising a sixteen level code for said multilevel code for providing sixteen possible color combinations of R,G,B and I.

35. A method in accordance with claim 34 wherein said digitally incoding step further comprises the step of digitally encoding said R,G,B,I video drive signal into said digitally encoded composite video signal comprising a seventeenth level for said multilevel code for providing sync information.

36. A method in accordance with claim 33 wherein said digitally encoding step comprises the step of digitally encoding said R,G,B,I video drive signal into a digitally encoded composite video signal comprising a sixteen level code for said multilevel code for providing sixteen possible color combinations of R,G,B and I.

37. A method in accordance with claim 36 wherein said digitally encoding step further comprises the step of digitally encoding said R,G,B,I video drive signal into said digitally encoded composite video signal comprising a seventeenth level for said multilevel code for providing sync information.

* * * * *